July 16, 1968  G. M. REIMER  3,392,692
SEWING MACHINE IMPROVEMENTS

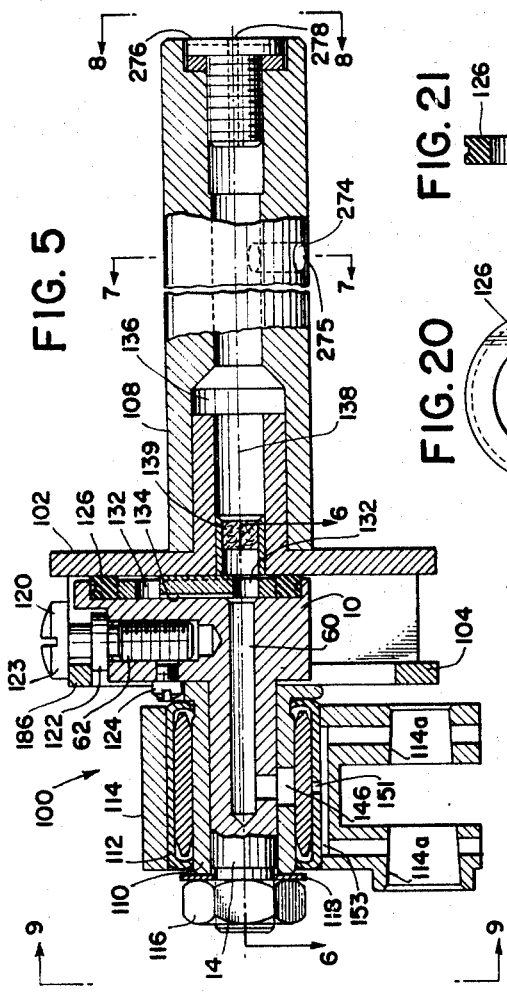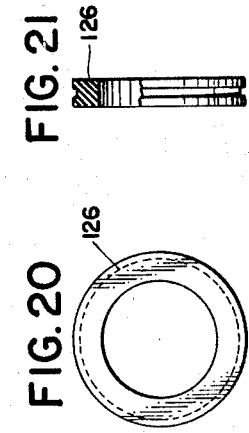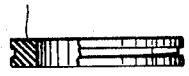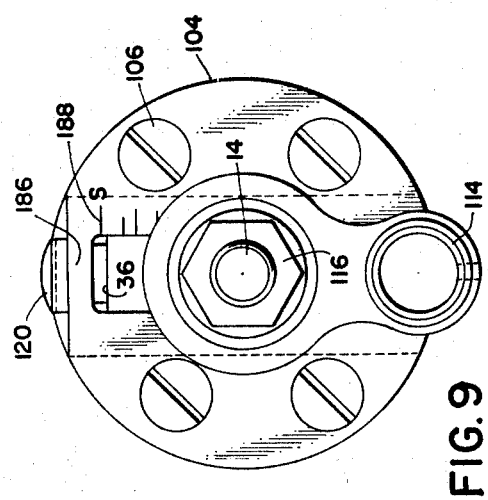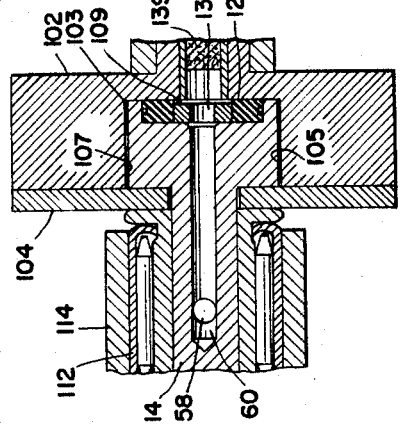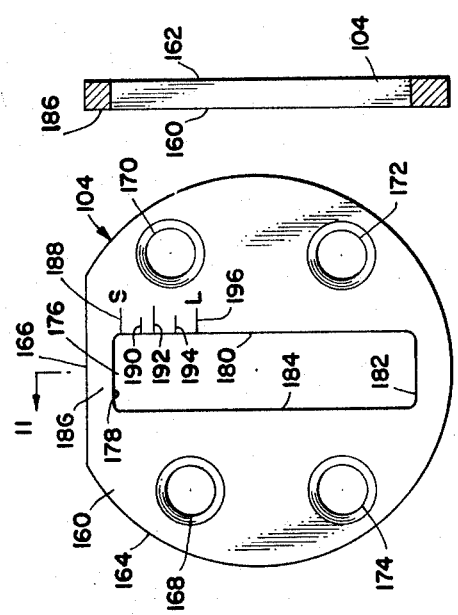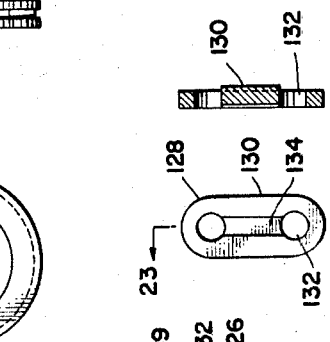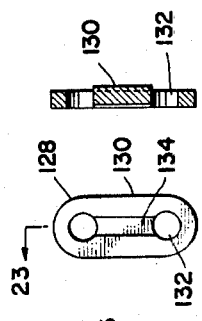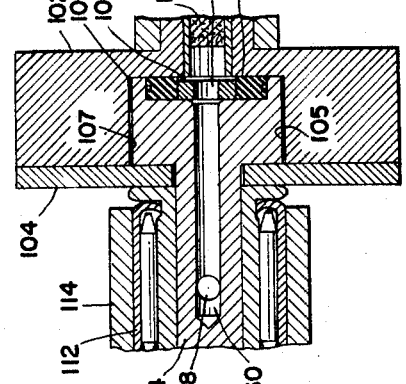

Filed Oct. 26, 1965  5 Sheets-Sheet 5

United States Patent Office 3,392,692
Patented July 16, 1968

3,392,692
SEWING MACHINE IMPROVEMENTS
George M. Reimer, Elmwood Park, Ill., assignor to Union Special Machine Company, Chicago, Ill., a corporation of Illinois
Filed Oct. 26, 1965, Ser. No. 505,288
11 Claims. (Cl. 112—210)

ABSTRACT OF THE DISCLOSURE

A variable feed mechanism for a high-speed sewing machine which comprises a main drive shaft having secured to one end thereof an assembly including a feed crank stud which is adjustable in a direction perpendicular to the axis of the drive shaft to vary the extent of feed motion to be imparted to a feed dog. The assembly incorporating the feed crank stud is retained on the end of the drive shaft by an index plate having indicia viewable from the left end of the sewing machine to indicate the adjustment of the crank stud, and hence the length of the feed stroke imparted to the feed dog. The assembly also incorporates lubricant-retaining means which serves as a small reservoir that communicates at one end with the bore of the main drive shaft, into which lubricant is automatically supplied from a main reservoir, and which communicates at its other end with a bearing surface provided on the crank stud.

---

This invention relates to sewing machines having a reciprocatory feed dog mechanism which determines the stitch length, and more particularly relates to a novel stitch length adjusting means and feed drive mechanism for such machines.

It is common practice in sewing machines, especially high speed industrial sewing machines, to enclose at least the major portion of the machine housing and to lubricate the parts within the housing through a mist of liquid lubricant. Such a lubrication system usually includes a lubricant reservoir in the bottom of the housing and a splasher attached to one of the rotating parts of the machine. As the splasher rotates, it dips into the oil of the reservoir to form an oil mist in the housing. The mist collects, or condenses on the walls and moving parts of the machine and flows back into the reservoir. The lubricant not only lubricates but also acts, to a certain extent, as a coolant.

Mist, or splash, lubrication systems are, for the most part, dependent upon the oil flowing or seeping into the area between the moving parts. While such flow or seepage is, to a certain degree, effective, it does not provide the desired degree of lubrication control at each point in the machine where lubrication might be desired.

In addition to the splash system, some sewing machines have heretofore been provided with pressure lubrication systems. Such pressure systems have required the addition of pumps to the machine. Such pumps add to the cost and maintenance of the machine and provide a different type of lubrication and cooling than is attained with a mist or splash system. In addition, pressure lubricating systems are more susceptible to oil leakage.

It is, of course, of considerable importance in a sewing machine to keep the working surface clean. This is particularly true with regard to oil, because oil, if it reaches working surfaces or any part of the machine exterior where it can come into contact with the material being sewed, soils and stains the material. Thus, while lubrication is important, it is equally important to control the lubrication and maintain the working surface and exterior of the machine free of lubricant.

In order to change the stitch length in flat bed sewing machines of well known types, it has been necessary in the past to first loosen a nut, rotate a screw in the proper direction, and then re-tighten the nut. The extent of the adjustment of the stitch length has been largely visual depending on the judgment of the mechanic carrying out the adjustment to the machine.

It is an object of the present invention to provide an improved feed crank assembly which has an improved lubrication system and a simplified means for accurately adjusting the stitch length provided by the work feeding mechanism of a flat bed sewing machine.

It is another object of the present invention to provide a mechanism associated with a stitch length adjusting mechanism for providing a positive and accurate indication of the stitch length as it is adjusted, thus removing the element of guess-work in carrying out the adjustment.

It is still another object of the present invention to provide an improved lubrication system for a feed crank assembly of a sewing machine which utilizes a hollow main shaft as a conduit for the delivery of lubricant.

A still further object is to provide an improved lubricating system for sewing machines wherein the oil flow can be controlled and the oil prevented from reaching the machine exterior or the material being sewed.

Other objects, features and advantages of the invention will appear from the detailed description of an illustrative form of the same, which will now be given in conjunction with the accompanying drawings, in which:

FIGURE 5 is an enlarged vertical sectional view showing one embodiment of the feed crank assembly of this invention in detail;

FIGURE 6 is a sectional view taken generally along line 6—6 of FIGURE 5;

FIGURE 9 is an end view of the feed crank assembly taken generally as indicated by line 9—9 of FIGURE 5, showing a stitch regulating screw and indicia plate in the present invention;

FIGURE 10 is a face view of an indicia plate of the type which is preferably used in the practice of the present invention;

FIGURE 11 is a cross-sectional view through the indicia plate taken generally along line 11—11 of FIGURE 10;

FIGURE 20 is a front elevational view of a sealing ring used in the practice of this invention;

FIGURE 21 is a side elevational view, partly in section, of the sealing ring of FIGURE 20;

FIGURE 22 is a front elevational view of an insert used in conjunction with the sealing ring of FIGURE 20; and FIGURE 23 is a sectional view of the insert taken generally along line 23—23 of FIGURE 22.

The objects of this invention may be secured through the use of a novel form of feed crank assembly. The feed crank assembly serves to connect a main drive shaft, through a feed crank link, feed rocker arm, feed rocker and feed bar, to a feed dog which moves work step-by-step through the path of a reciprocatory needle. The improved feed crank assembly permits ready and accurate adjustment of the stitch length and provides a positive indication of the stitch length resulting from various adjustment positions.

A brief description will first be given of the primary features of the invention, and a more detailed description of the machine will then be given.

Figure 12:
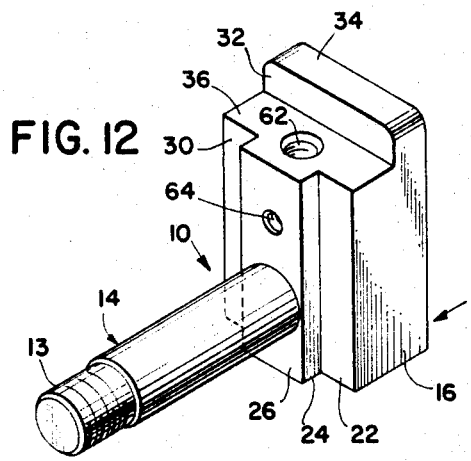
FIGURE 12 is an isometric view of a feed crank stud showing one embodiment of certain novel features of the present invention.
Figure 13:
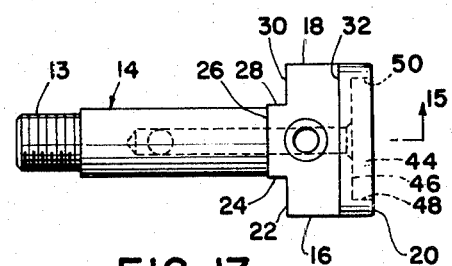
FIGURES 13, 14, 15 and 16 are views of the feed crank stud of FIGURE 12 showing, respectively, a plan view, a front elevational view, a sectional view taken generally along line 15—15 of FIGURE 13, and a rear elevational view of the device.
Figure 14:
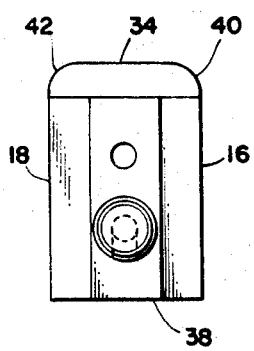
Figure 15:
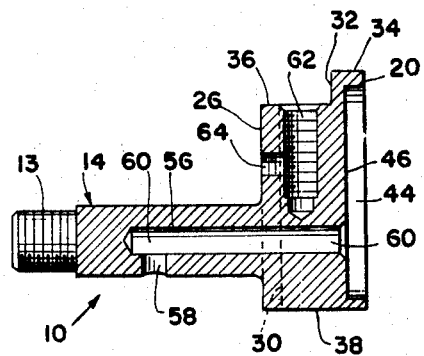
Figure 16:
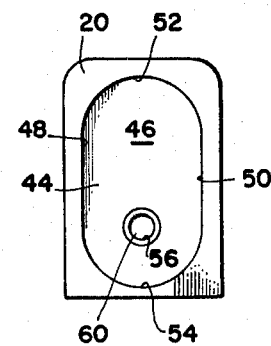

The improved assembly is made up of a head 102 which is connected to the left end (FIG. 5) of a main shaft 108 and has a slot defined in it, by walls 105, 107 and 109 (FIG. 6), extending through the axis of the main shaft at right angles to such axis. It is to be understood that the head may be formed integral with the main shaft, if desired. An indicia plate 104 is connected to the main shaft head and has an elongated slot 176 defined in it. A feed crank stud 10 (FIG. 12) having an integral, enlarged mounting portion 12 is disposed within the slot in the main shaft head and is arranged to slide in this slot at right angles to the main shaft axis. The stud portion 14 projects through the slot 176 in the indicia plate 104 and is disposed with its axis substantially parallel to the axis of the main shaft. A stitch regulating screw 120 is threadably attached to the mounting portion of the feed crank stud and has a means, such as an annular slot between a head and a shoulder, which rotatably engages a retaining bar 186 extending laterally from the indicia plate. By rotating the stitch regulating screw, the feed crank stud is moved within the slot provided in the head 102, nearer or farther from the axis of the main shaft. By varying the relative displacement between the axis of the main shaft and the axis of the feed crank stud, the stroke of the feed dog is varied and the sitch length is effectively controlled. The indicia plate is provided with one or a series of permanent lines, produced for instance by scoring or etching. One or a series of lines may be provided on the mounting portion of the feed crank stud and cooperate with the line or lines on the indicia plate to indicate stitch length. Preferably a readily visible line or surface 36 (FIG. 9) on the mounting portion of the feed crank stud is selected which, in cooperation with lines 188 provided on the indicia plate, indicates stitch length.

Figure 1:
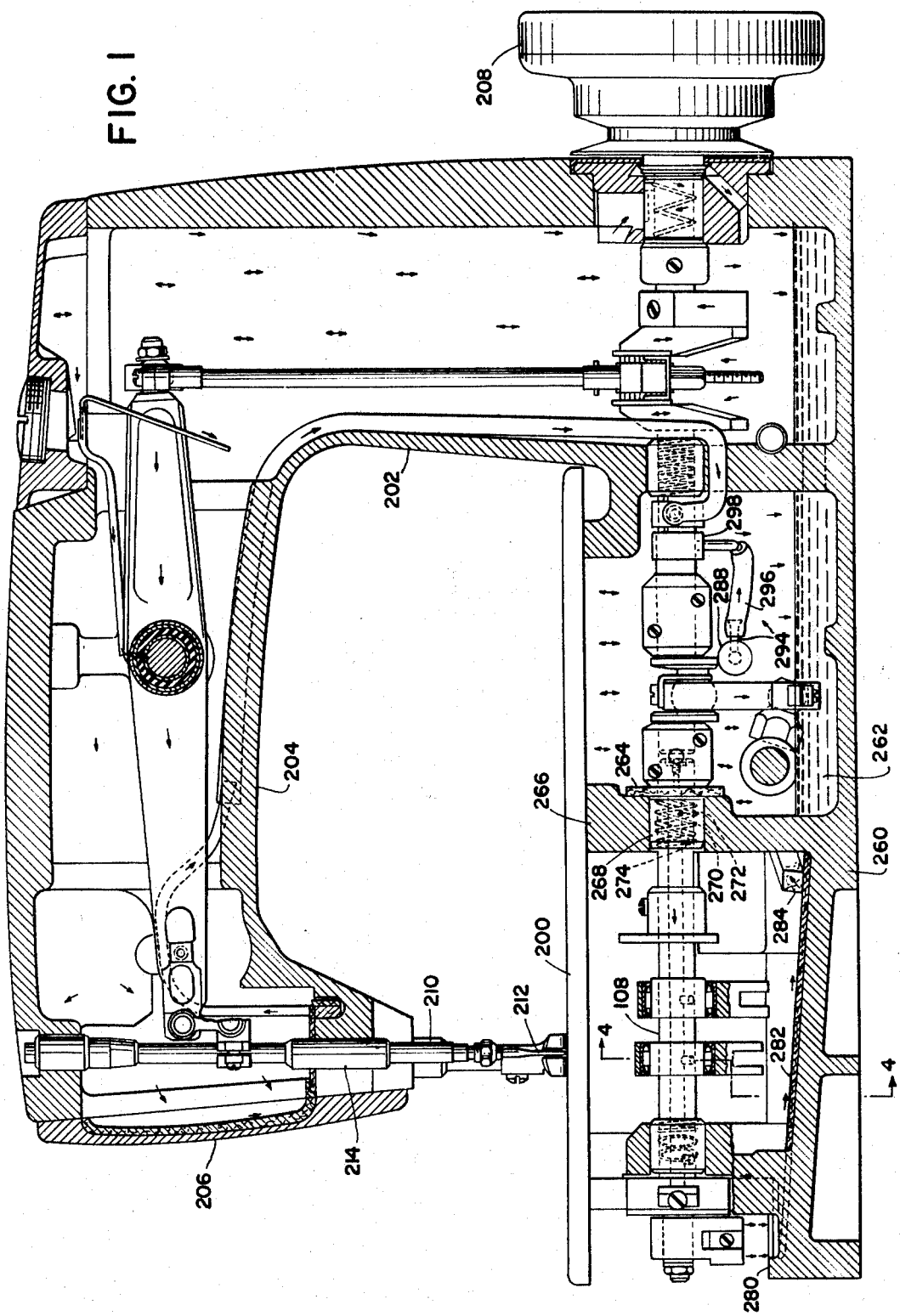
FIGURE 1 is a view, partly in front elevation but largely in vertical section, showing a sewing machine embodying the invention.
Figure 2:
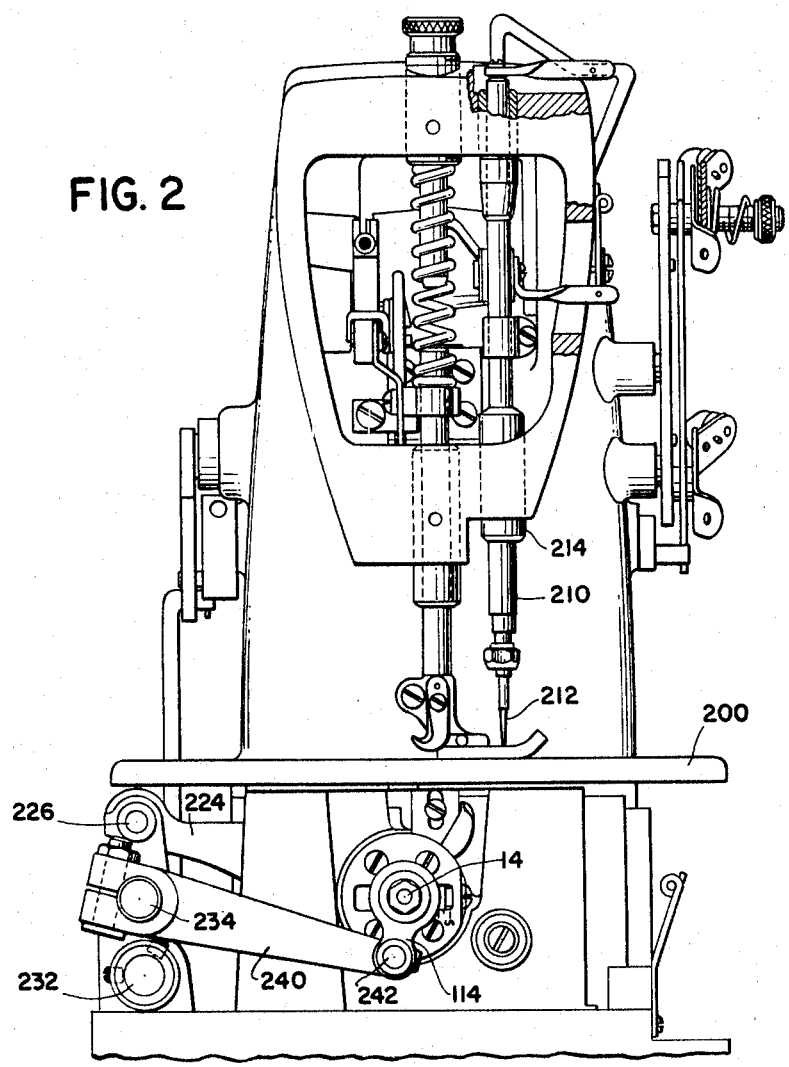
FIGURE 2 is an end elevational view of the machine of FIGURE 1, as seen from the needle head end, the cover for the needle head being removed and certain parts being shown in section to more clearly illustrate the mechanism.
Figure 7:
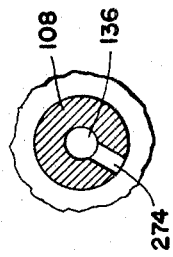
FIGURE 7 is a cross-sectional view taken generally along line 7—7 of FIGURE 5 and showing a lubrication inlet port.

The lubrication system may be understood by referring to FIGURES 1 and 2. The bed casting 260 in FIGURE 1 has been designed to contain an oil reservoir 262 in which is created a fine oil mist which is provided by the splashing of the various moving parts passing through the lubricant in the reservoir at high speeds. A portion of the oil mist and splashing oil gathers on a felt washer 264 fixedly secured to a reservoir wall 266 which also acts as a bearing support. A bearing 268 is provided with oil grooves 270, 272. Groove 272 is the reverse thread direction to that of groove 270. As a result, as the main shaft 108 is rotated in a counterclockwise direction (when viewed from the pulley end), the bearing 268 acts as a pump, drawing the lubricant by suction means from the felt washer 264 through groove 272 into a shaft inlet port 274 (FIGURES 1, 5 and 7). Because groove 270 is in a reverse direction to groove 272, any lubricant by-passing the inlet port 274 will be forced back toward and into the port 274.

Figure 8:
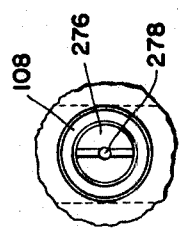
FIGURE 8 is an end view of the feed crank assembly taken generally as indicated by line 8—8 of FIGURE 5.

The pump system normally provides an excess amount of lubricant to the bore 136 of main shaft 108. Any excess lubricant will escape through the vent 278 of screw 276 located in the end of the main shaft 108 (FIGURES 1, 5 and 8). The remaining lubricant within the bore 136 spreads itself as a thin film around the inside surface of the shaft 108 and continuously moves toward the head of the shaft (the left end as viewed in FIGURE 1) as the shaft is rotated.

A lubrication system is provided in the feed crank assembly and permits lubricant from the passageway 136 to lubricate the feed crank assembly and associated members. The main shaft head 102 has a passage 138 in it which communicates at one end with the main shaft passageway 136. The mounting portion of the feed crank stud has a cavity defining a reservoir which communicates with the passageway in the main shaft head. An insert and sealing means may be provided in the cavity to aid in defining the reservoir. A passageway 60 is provided through the feed crank stud, communicating at one end with the reservoir, and at the other end with the surface of the feed crank stud.

Lubricant from the main shaft passageway 136 passes through the main shaft head passageway 138 into the reservoir and then through the feed crank stud to the stud surface, through a ferrule 110 into a needle bearing 112 and through the needle bearing to other parts associated with it.

A lubricant return system has been designed for the left hand and rear base portion of the machine, and provides a return of lubricant from the feed crank assembly. The means of lubricating the feed crank assembly results in an excess of lubricant in the base outside of the reservoir. It follows then that this excess lubricant must be removed and returned to the reservoir in order to prevent overflow. The return of lubricant from the feed crank assembly may be accomplished by providing a vertical lip 280 all the way around the left hand portion of the base 260 (as viewed in FIGURE 1) in order to contain the lubricant.

A piece of felt 282 is provided in the bottom of the base within the cofines of the lipped area. Any lubricant that drops from the walls, bearings, supports and operating parts will eventually come into contact with and be absorbed by the felt 282. A second piece of felt 284 rests on felt 282 and is attached to a tube 286 soldered to a connector 288. The connector is fixedly attached by a nut 290 to a back cover 292 enclosing the rear portion of the oil reservoir 262. A second tube 294 is also soldered to the connector 288 and permits the connection of a flexible conduit 296, such as a plastic tube. The conduit 296 is connected at its other end to a pump 298. Therefore lubricant falling on the felt 282 is removed by capillarity suction by felt piece 284 through the tube 286, and flows back into the reservoir impelled by pump 298.

As may be seen with regard to FIGURES 12–16, the feed crank stud 10 is comprised of a mounting portion 12 and an integral projecting stud portion 14 having a threaded end portion 13.

The mounting portion is defined by surfaces 16, 18, 20, 22, 24, 26, 28, 30, 32, 34, 36 and 38. Surfaces 16 and 18 and 34 are connected by arcuate surfaces 40 and 42, respectively. A recessed cavity 44 is defined inwardly from surface 20 by substantially flat surfaces 46, 48 and 50 and arcuate surfaces 52 and 54. A lubricant passageway 60 is defined in the mounting portion 12 by cylindrical surfaces 56 and 58. A branch of the passageway 60 extends through the wall of stud 14 to its outer surface, by way of surface 58.

The mounting portion contains a threaded bore 62 to accommodate a stitch regulating screw, as will be described below. A threaded bore 64 communicates with bore 62 to accommodate a set screw, as will be described below.

The feed crank stud assembly involved in the present invention is best shown in FIGURE 5. There the feed crank stud assembly 100 is shown to be made up of the feed crank stud 10, which is connected to main shaft head 102 by an indicia plate 104 and screw fasteners 106 (FIGURE 9). The main shaft head 102 is press fitted into main shaft 108. The slot 103, provided by surfaces 105, 107 and 109, is formed in the head 102. Adjustable feed crank stud 10 is so designed that its surfaces 16, 18, 20 will slide in the slot 103 in guiding contact with surfaces 105, 107, 109, respectively. The surfaces 22, 24, 28, 30 slide in guiding contact with cooperating surfaces of the overall assembly.

Ferrule 110 is mounted on the stud portion 14. Needle bearing 112 is press fitted into feed crank link 114 which has its upper end surrounding said needle bearing and the stud 14. Nut 116 and washer 118 retain the feed crank link in axial position on the feed crank stud. At its lower end the crank link 114 is connected by a tapered or frusto-conical pin 242 (FIGURE 2) with an arm 240 arranged to impart a rocking movement to a frame 228, and in turn a reciprocatory movement to a feed bar 224.

A stitch regulating screw 120 is disposed in screw threaded bore 62 at substantially a right angle to the axis of the main shaft and has a flange 122 which is interposed between a lateral bar or extension 186 of indicia plate 104 and surface 36 on mounting portion 12 of element 10. A screw 124 is disposed in screw threaded bore 64 and has its head arranged to cooperate with a ferrule as will be explained.

A sealing ring 126 (FIGURES 20 and 21) is assembled to the outside edge portion 128 of a feed crank stud insert 130 (FIGURES 22 and 23). Orifices 132 and a groove 134 in the insert 130 act as a lubricant reservoir. When the assembly is disposed in the cavity 44, it forms a liquid tight seal between the feed crank stud 10 and the main shaft head 102.

In operation, lubricant flows through passageway 136 in the main shaft 108, through passageway 138 in the main shaft head 102 into the cavity 44 and the reservoir formed by the orifices 132 and the groove 134. From this reservoir lubricant is fed into passageway 60 from which it passes to the stud surface. A porous oil plug 139, which may be made of a material such as felt or sintered metal, regulates the flow of oil through passageway 138.

Figure 18:
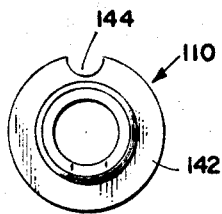
FIGURE 18 is an end view of the ferrule as seen from the left of FIGURE 17.
Figure 17:
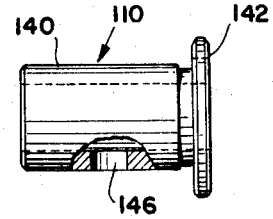
FIGURE 17 is a side elevational view, partly in section, of a ferrule used in cooperation with feed crank stud of the present invention.

As may be best seen in FIGURES 17 and 18, ferrule 110 may be made up of a substantially cylindrical portion 140 having an annular rim 142 at one end. An indexing notch 144 is contained in the rim 142 in alinement with the set screw 124. Orifice 146 communicates with a passageway in the needle bearing 112 (FIGURE 19) and permits oil flowing through the passage 60 to pass through the ferrule and into needle bearing 112.

Figure 19:
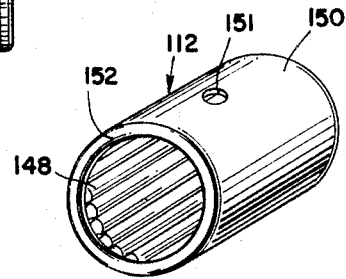
FIGURE 19 is an isometric view of a needle bearing used in cooperation with the ferrule of FIGURE 17 in the practice of the present invention.

As may be best seen in FIGURE 19, the needle bearing 112 is made up of a plurality of cylindrical pins or rollers 148 retained in a casing 150 by crimped ends 152. An oil hole 151 is provided through the wall of the casing for delivery to other parts.

Ferrule 110 is revolved with the stud 14 and is retained against turning relation to the latter to any appreciable extent by screw 124, the head of which fits into the indexing notch 144 of the ferrule. Since the screw 124 rotates with the stud 14 as the main shaft 108 is rotated, the corresponding rotation of ferrule 110 serves to spread lubricant throughout the entire needle bearing 112. The needle bearing 112, being press fitted into the feed crank link 114, simply oscillates with the link, thus maintaining the oil hole 151 of the needle bearing in continuous alinement with an oil groove 153 in link 114 (see FIGURE 5), so that excess lubricant in the needle bearing may drain downward in the proper direction. Lubricant is thus provided to a tapered pin 242 (FIGURE 2), which cooperates with tapered openings 114a in the downwardly extending portion of link 114 thus serving to attach a feed rocker arm 240 to the feed crank link. It will be understood that the forward end of arm 240 is positioned between the two downwardly extending portions of link 114 and has an opening therethrough which receives the tapered pin.

Turning now to FIGURES 9, 10 and 11, the indicia plate 104 may be seen to be a substantially flat plate having an outer face surface 160 and an inner surface 162 and to be substantially round, its periphery having a circumferential surface 164 and a chord surface 166. The indicia plate contains four tapered orifices 168, 170, 172 and 174 to receive fasteners 106, such as flat head machine screws, by which it is securely attached to the main shaft head 102. The orifices are asymmetrically arranged so the indicia plate may be assembled in only one orientation. An elongated orifice 176 is defined by surfaces 178, 180, 182 and 184.

When the indicia plate is assembled into the feed crank stud assembly, surface 180 is adjacent surface 24 of the feed crank stud while surface 184 is adjacent surface 28 of the feed crank stud. The surfaces act as guides to permit adjustment of the feed crank stud in the direction of the length of the elongated orifice. Limitation of adjustment occurs with the engagement of surface 36 of the feed crank stud with the bottom of flange 122 of screw 120, or surface 182 with surface 38 of the feed crank stud.

Between surfaces 178 and 166 there is provided the lateral extension 186 which serves to retain the screw 120, as previously mentioned. As best seen in FIGURE 5 the height of the extension 186 is desirably substantially the same as the distance between the shoulder 122 and the head 123 of the screw 120 so that positive positioning of the feed crank stud may be maintained whether the scr screw is being moved in or out of the tapped bore 62. Index lines 188, 190, 192, 194 and 196 are etched in the surface 160 adjacent surface 180 and near the lateral extension 186. The index lines serve to indicate the position of surface 36 with regard to the indicia plate during adjustment of screw 120. The index lines are so positioned that when the surface 36 is in line with index line 188, the shortest stitch lengths will occur. When surface 36 is alined with index line 196 the longest stitch lengths will occur. The letters S and L etched on the surface 160 are indicative of the extremes of stitch length. The index lines 190, 192 and 194 indicate adjustment positions for the surface 36 in order to produce stitches of intermediate lengths.

It is to be understood that instead of using surface 36 as the indexing point, other points on the stud may be used. If desired, indexing lines may be made on the stud, particularly on the mounting portion.

The invention has been illustrated in connection with a sewing machine of the general character shown in Peterson et al. Patent 2,577,430, granted Dec. 4, 1951, but is adaptable for use with other types of machines. The illustrative machine may be provided with a needle adapted to be reciprocated from a position above the work support of the frame to a position in which the thread carrying eye of the needle is below said work support and there cooperate with a looper, having loop seizing and shedding movements transverse to the line of feed, for the formation of a line of stitches of the two-thread chain stitch type.

The frame of the machine, as shown in FIGURES 1 and 2, is provided with a work supporting base 200, a vertical standard 202, and an overhanging arm 204 terminating in a needle head 206, which carries a needle bar 210 and needle 212 arranged for vertical reciprocation in a sleeve 214. The rotary main shaft 108 is journaled in suitable bearings in the base of the frame and serves to operate all the devices within the machine. It is preferably formed of several interconnected sections to facilitate assembly of the various parts. Shaft 108 extends outwardly through the right end wall of the frame and has secured thereto a combined handwheel and pulley 208 adapted for connection by a belt with a suitable power source, such as an electric motor (not shown), and adapted also for turning by hand.

Figure 4:
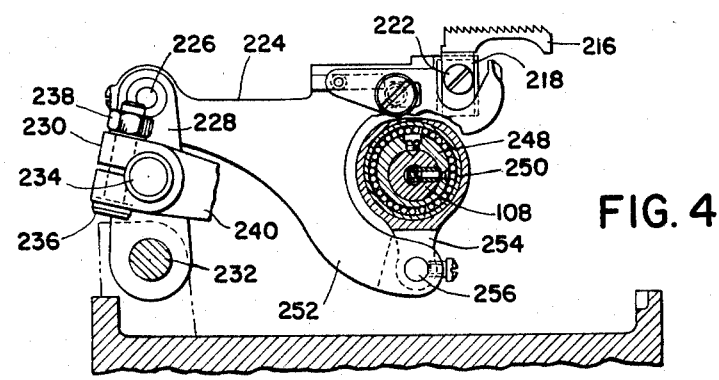
FIGURE 4 is a vertical section view taken in part along line 4—4 of FIGURE 1, showing a portion of the work feeding mechanism of the machine.
Figure 3:
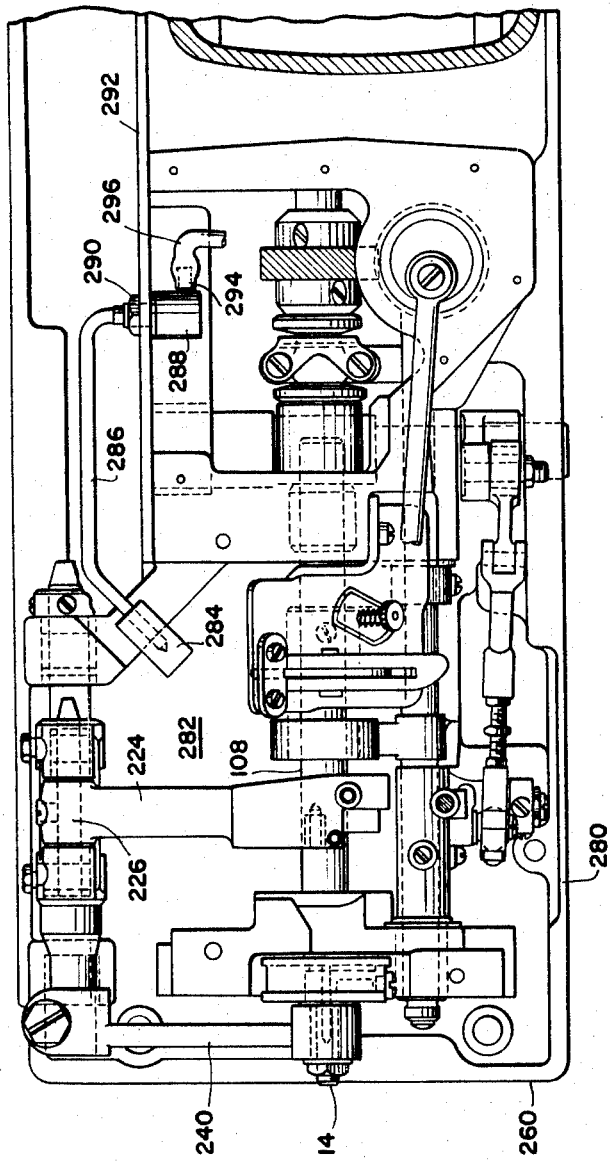
FIGURE 3 is a view, partially in plan and partially in horizontal section, showing the mechanism in most of the base portion of the frame of the machine of FIGURE 1.

The mechanism in the base of the machine for advancing the work in the course of stitch formation is best shown in FIGURES 2 and 4. The work advancing mechanism comprises a feed dog 216 having a downwardly extending shank 218 having a slightly elongated slot (not shown) to permit slight vertical adjustment of the feed dog. Said slot receives a screw 222 to secure the feed dog 216 to the forward end of a feed bar 224. At its rearward end, the feed bar 224 is pivotally connected by means of a shaft 226 with upwardly extending arms of a feed rocker 228. Downwardly extending arms of the latter are arranged for rocking movement about the axis of a shaft 232. At an intermediate point the feed rocker 228 is provided with a laterally extending stud 234 to which is secured, by means of bolts 236 and nuts 238, a split clamping portion 230 at the rear end of the downwardly and forwardly extending feed rocker arm 240. At its forward end the feed rocker arm is pivotally connected by the hollow pin 242 with the lower end of the feed crank link 114, as previously explained. By appropriate adjustment of the feed crank stud 12, the extent of rocking movement imparted to the feed rocker 228 may be varied to impart a desired feed stroke to the feed dog 216. It will be apparent that through the connections described, the feed dog will be given its work advancing and return movements. Lifting and lowering movements are imparted to the feed dog by the mechanism shown in FIGURE 4. This includes a feed lift eccentric 248 secured to the main shaft 108. Surrounding the eccentric 248 is a needle bearing unit 250, and surrounding the latter is the strap portion of a feed lift 254. This is connected by a pin 256 with a downwardly and forwardly extending arm 252 of the feed bar. By these connections and the action of the feed rocker arm the feed dog is given the desired path of movement for advancing the work.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In a sewing machine having a rotary drive shaft, a central lubrication passage in said drive shaft, and a feed dog arranged to feed work step-by-step in a predetermined direction, the feed dog being driven from the rotary drive shaft through a feed crank stud and connected linkage, the improvement of the feed crank stud assembly which comprises:
    (a) a feed crank stud,
    (b) means adjustably connecting said stud to the drive shaft,
    (c) an indicia plate secured to said drive shaft and having a flat face which is calibrated and arranged to cooperate with said stud to indicate the position of said feed crank stud relative to the drive shaft thereby indicating the stitch length, said indicia plate being readily viewable from the left-hand end of the machine, and
    (d) a lubricant passageway defined in said stud communicating at one end with said central lubrication passage in said drive shaft and at the other end with a bearing surface of said stud.

2. An improved feed crank link assembly as defined in claim 1 further comprising a lubricant reservoir defined between said stud and said main shaft communicating with said stud lubricant passageway and with said drive shaft lubricant passageway, and sealing means surrounding said reservoir interposed between said stud and main shaft, whereby lubricant is retained in said reservoir.

3. In a sewing machine having a rotating main shaft and a reciprocatory feed dog driven thereby, an improved feed crank assembly interconnecting said main shaft with said feed dog, comprising a main shaft head connected to the main shaft, a feed crank stud connected to the main shaft head for rotation thereby, means adjustably connecting said feed crank stud to said main shaft to enable the axis of said feed crank stud to be adjusted relative to the axis of rotation of the main shaft, an indicia plate secured to said main shaft head, means connected to said feed crank stud and said indicia plate for adjusting the displacement of the axis of said feed crank stud relative to the axis of said main shaft, whereby the extent of movement of said feed dog is varied and the stitch length is varied proportionately, calibration marks on a flat surface of said indicia plate, and at least one calibration mark on said feed crank stud cooperating with said calibration marks on said indicia plate to indicate stitch length.

4. An improvement in a sewing machine according to claim 3 wherein the means for adjusting the position of the axis of the feed crank stud relative to the main shaft axis comprises a stitch regulating screw disposed substantially at right angles to said main shaft axis and having a threaded portion and a head and a shoulder spaced apart from one another, a tapped bore in said feed crank stud adapted to engage said threaded portion of said regulating screw, a detent bar on said indicia plate, said head and said shoulder rotatably engaging said detent bar between them whereby rotation of said adjusting bolt moves said feed crank stud relative to said indicia plate.

5. In a sewing machine an improved feed crank assembly for controlling and indicating stitch lengths while transmitting power from a main shaft to a feed dog through intermediate linkage comprising:
    (a) a main shaft head connected to the main shaft,
    (b) means connected to said head having a slot therein passing through the main shaft axis of rotation at substantially right angles to said axis,
    (c) an indicia plate connected to said means,
        (1) an elongated slot extending through said plate,
    (d) a feed crank stud extending through said slot in said plate and having a mounting portion, the axis of rotation of said stud being substantially parallel to the axis of the main shaft, and said mounting portion being disposed between said plate and main shaft head and adapted for adjustable movement in said first mentioned slot along an axis at substantially right angles to said main shaft axis, to displace the axis of said stud a selected distance from the axis of said shaft, said stud portion being adapted to impart motion through the intermediate linkage to the feed dog to an extent determined by the displacement of the axis of rotation of said stud from said main shaft axis,
    (e) and adjustment means connected to said mounting portion and said plate whereby the axis of rotation of said stud may be moved relative to said main shaft axis, whereby the stitch length is changed, the resultant stitch length being indicated by said indicia plate in conjunction with the mounting portion of said feed stud.

6. An improved feed crank assembly as defined in claim 5 wherein said adjustment means is threadably connected to said mounting portion and rotatably connected to said indicia plate, whereby rotation of said adjustment means varies the displacement between the axes of rotation of said stud and said main shaft.

7. An improved feed crank link assembly according to claim 5 further comprising:
 (a) a lubricant passage in said main shaft head communicating with a lubricant passage in the main shaft,
 (b) a cavity in said mounting portion of the stud providing a lubricant reservoir communicating with said lubricant passage in said main shaft head,
 (c) a passageway through said stud communicating at one end with said reservoir and at the other end with said intermediate linkage.

8. An improved feed crank assembly according to claim 7 further comprising:
 (a) a ferrule disposed about said feed crank stud for rotation therewith, said ferrule having a passage through its wall for delivering lubricant from said feed crank stud,
 (b) a needle bearing disposed about said ferrule and cooperating with a portion of said intermediate linkage, and
 (c) an orifice in said needle bearing forming a passageway for lubricant from said bearing to other parts of said intermediate linkage.

9. In a sewing machine having a rotary main shaft an improved feed crank assembly comprising:
 (a) a head structure mounted on said main shaft substantially concentrically with the axis of rotation of said main shaft, and having a slot defined therein passing through said axis of rotation at substantially right angles thereto,
 (b) a feed crank stud having an integral mounting portion,
  (1) a plurality of planar guiding surfaces on said mounting portion oriented at right angles to the axis of rotation of said stud, and
  (2) a screw threaded bore formed in said mounting portion at right angles to the axis of rotation of said feed crank stud,
 (c) a stitch regulating screw threadably mounted in said bore,
  (1) a head portion integral with said screw, and
  (2) a shoulder portion integral with said screw and spaced apart from said head,
 (d) an indicia plate connected to said main shaft head and disposed perpendicularly to the axis of the main shaft,
  (1) an elongated slot in said indicia plate providing guiding surfaces, said mounting portion of said stud being slidably mounted between said indicia plate and a portion of said head structure mounted on said main shaft, said stud extending through said indicia plate slot,
  (2) a detent bar carried by said indicia plate, and adapted to engage said screw between the shoulder and the head thereof, whereby rotation of said screw causes a movement of said feed crank stud at right angles to the axis of rotation of said main shaft and regulation of the stitch length, and
  (3) means on said indicia plate and on said mounting portion of the stud arranged to indicate the stitch length for which said feed crank stud has been set.

10. In a sewing machine as set forth in claim 9, said feed crank assembly further comprising:
 (a) a passageway in said main shaft for receiving and delivering lubricant,
 (b) a lubricant reservoir in said mounting portion communicating with said passageway in said shaft, and
 (c) a passageway through said mounting portion and said stud providing a channel for lubricant for connecting said reservoir to the other surface of said stud, whereby lubricant entering said reservoir from said passageway in said main shaft is distributed to the surface of said feed crank stud.

11. In a sewing machine having a main drive shaft and a work feeding mechanism driven by said shaft, a feed crank stud adjustably connected to said main shaft, connections from said stud to said work feeding mechanism for operating the latter; a small lubricant reservoir provided within a portion of said stud, a passageway through said stud forming a conduit for the passage of lubricant from said reservoir, said reservoir being connected to a source of lubricant provided in the main shaft, said passageway being connected to a distribution conduit for said lubricant to lubricate relatively moving surfaces in said connections from said stud to said work feeding mechanism.

References Cited
UNITED STATES PATENTS

| | | | |
|---|---|---|---|
| 1,543,946 | 6/1925 | Moffatt | 112—210 |
| 2,048,874 | 7/1936 | Kucera | 112—210 |
| 2,161,579 | 6/1939 | Kaier | 112—210 |

RICHARD J. SCANLAN, JR., *Primary Examiner.*